Patented Jan. 7, 1941

2,228,156

UNITED STATES PATENT OFFICE 2,228,156

SELENOAZOLIDONES AND PROCESS OF PREPARING THEM

Adolf Sieglitz and Paul Heimke, Frankfort-on-the-Main, Germany, assignors to General Aniline & Film Corporation, New York, N. Y., a corporation of Delaware No Drawing. Application January 17, 1940, Serial No. 314,242. In Germany February 8, 1939

9 Claims. (Cl. 260—298)

The present invention relates to a process of producing selenoazolidones and to the new compounds obtainable thereby.

We have found that the hitherto unknown 2-seleno- and 2-thio-selenoazolidones-4 of the general formula:

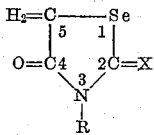

wherein R represents a radical of the group consisting of alkyl, cycloalkyl, aralkyl and aryl, and X means sulfur or selenium,
are obtainable in a well proceeding reaction by causing a compound of the general formula:

$$R-N=C=X$$

wherein R represents a radical of the group consisting of alkyl, cycloalkyl, aralkyl and aryl, and X means sulfur or selenium,
to react with selenoglycolic acid in the presence of an aqueous strong acid while excluding oxygen from the reaction mixture, preferably at an elevated temperature. The ratio of concentration of the acid may be chosen in such a manner that, after the reaction, the solution obtained shows at normal temperature a pH-value of about 0.4. The exclusion of oxygen may be effected by performing the reaction in the presence of a non-oxydizing gas, such as nitrogen or hydrogen.

The reaction probably proceeds according to the scheme:

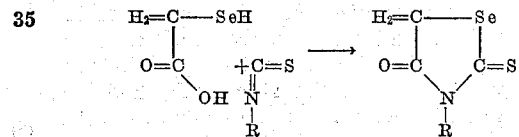

wherein R has the meaning indicated above.

The new 2-seleno- and 2-thio-selenoazolidone-4 are mostly weakly yellow colored crystalline compounds which, according to their =CH$_2$, =C=S or =C=Se groups, are qualified to various reactions. Our new compounds are valuable intermediate compounds for the preparation of pharmaceutical products and of sensibilizing dyestuffs etc.

The selenoglycolic acid used as starting material is obtainable, for instance, by treating diselenodiglycolic acid:

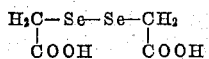

preferably in the form of its soluble salts, with a reducing agent, favorably at an elevated temperature, while excluding oxygen.

Suitable reducing agents are, for instance, grape sugar, (dextrose), zinc dust, sodium sulfide, sodium hydrosulfide, alkali metal polysulfides. The exclusion of air may, for instance, be obtained by carrying out the reaction in the presence of nitrogen, hydrogen or carbon dioxide.

The following examples serve to illustrate the invention but they are not intended to limit it thereto, the parts being by weight unless otherwise stated:

1. To a freshly prepared aqueous solution of 139 parts of selenoglycolic acid there are at once added, while introducing nitrogen, 87 parts of ethyl mustard oil C$_2$H$_5$—N=C=S, 800 parts by volume of ethyl alcohol and 1000 parts by volume of hydrochloric acid (1.11); the mixture is then heated to boiling for 2 hours on the steam bath and thereupon cooled to room temperature. Without stirring, the mixture is allowed to stand for about 10 hours at room temperature. After this time the 3-ethyl-2-thio-1-selenoazolidone-4 of the formula:

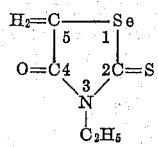

has separated in the form of an oil. The reaction product is worked up by strongly cooling it whereby the oil solidifies to form a crystal cake from which the aqueous alcoholic mother liquor is poured off. The crude 3-ethyl-2-thio-1-selenoazolidone-4 is purified by recrystallizing it from a small quantity of methyl alcohol and dried in the vacuum at 30° C. It melts at about 61° C. to 62° C. By concentrating the mother liquor and simultaneously cooling, further quantities of the compound are obtained. The yield amounts to 65 per cent (calculated upon the ethyl mustard oil).

By using methyl mustard oil CH$_3$—N=C=S instead of ethyl mustard oil the 3-methyl-2-thio-1-selenoazolidone-4 is obtained in a smooth reaction.

The solution of 139 parts of selenoglycolic acid used as starting material may be obtained by the following manner:

To a solution of 145 parts of diseleno diglycolic acid of 95 per cent strength in 300 parts of water there is added at room temperature, while introducing nitrogen, a solution of 110 parts of dextrose in 360 parts of water and 484 parts of a caustic soda solution of 25.6 per cent strength; the mixture is then heated, while stirring, for 30 minutes at 90° C. to 100° C. and cooled to room temperature.

2. To a freshly prepared aqueous solution of 139 parts of selenoglycolic acid there are at once added, while introducing nitrogen, 99 parts of allyl mustard oil $CH_2=CH-CH_2-N=C=S$, 800 parts by volume of methyl alcohol and 1000 parts by volume of hydrochloric acid (1.11). When treating this mixture according to the process described in Example 1, the 3-allyl-2-thio-1-selenoazolidone-4 of the formula:

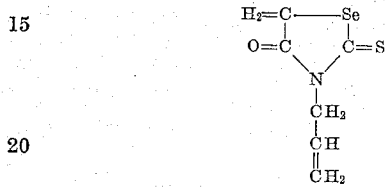

is obtained in the form of yellowish crystals melting at 45° C. to 46° C. The yield amounts to 52 per cent.

3. To a freshly prepared solution of 139 parts of selenoglycolic acid there are at once added, while introducing nitrogen, 135 parts of phenyl mustard oil $C_6H_5-N=C=S$ which are dissolved in 800 parts by volume of ethyl alcohol, and 1000 parts by volume of hydrochloric acid (1.11). The mixture is treated as described in Example 1. When being heated the 3-phenyl-2-thio-1-selenoazolidone-4 of the formula:

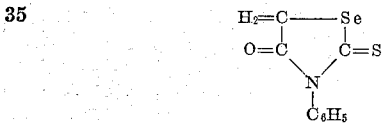

separates after some time in the form of yellow needles which are isolated as described in Example 1. The compound is only sparingly soluble in hot alcohol and, after extraction with boiling alcohol, has a melting point of 202° C. The yield amounts to 62 per cent.

With the same result there may also be used, instead of phenyl mustard oil, ortho- or para-methylphenyl mustard oil or ortho- or para-ethoxy-phenyl mustard oil. Phenyl compounds with other substituents in the phenyl nucleus are also applicable.

4. To a freshly prepared aqueous solution of 139 parts of selenoglycolic acid there are added, while introducing nitrogen, 182 parts of phenyl seleno mustard oil $C_6H_5-N=C=Se$, 800 parts by volume of ethyl alcohol and 1000 parts by volume of hydrochloric acid (1.11). By treating the mixture according to the process described in Example 1, the 3-phenyl-2-seleno-1-selenoazolidone-4 of the formula:

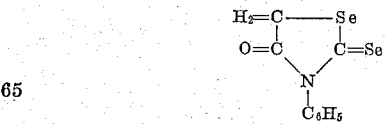

is obtained in a smooth reaction.

5. To a freshly prepared aqueous solution of 139 parts of selenoglycolic acid there are added, while introducing hydrogen, 149 parts of benzyl mustard oil $C_6H_5-CH_2-N=C=S$, 800 parts by volume of ethyl alcohol and 1000 parts by volume of hydrochloric acid (1.11). The mixture is heated for 3 hours at boiling temperature and it is then worked up according to Example 1. The 3-benzyl-2-thio-1-selenoazolidone-4 of the formula:

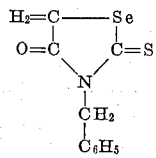

which crystallizes in the form of yellowish leaflets, melts at 120° C. to 121° C. The yield amounts to 60 to 70 per cent.

6. By adding 141 parts of cyclohexyl mustard oil, 800 parts by volume of ethyl alcohol and 1000 parts by volume of hydrochloric acid (1.11) to a freshly prepared aqueous solution of 139 parts of selenoglycolic acid, while introducing carbon dioxide, and heating the mixture for 4 hours to boiling, the 3-cyclohexyl-2-thio-1-selenoazolidone of the formula:

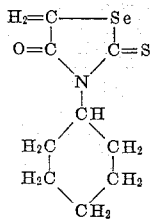

is obtained in a smooth reaction in the form of an oil which is crystallized by cooling and triturating with methyl alcohol. The selenoazolidone crystallizing from ethyl alcohol in the form of fine needles melts at 159° C. The yield lies between 50 and 60 per cent.

7. To a solution of 29 parts of diseleno-diglycolic acid in 65 parts of water there are added, while introducing nitrogen, first a solution of 22 parts of dextrose in 75 parts of water and, thereupon, 73 parts of a caustic soda solution of 33 per cent strength and the mixture is then heated for 30 minutes to 80° C. to 90° C., preferably while stirring. The aqueous solution thus prepared contains the selenoglycolic acid in the form of its sodium salt.

8. 29 parts of diseleno diglycolic acid are dissolved in 80 parts of water, 94 parts of a caustic soda solution of 95 per cent. strength are then added, while stirring, whereupon 20 parts of zinc dust are introduced in small quantities, while passing in hydrogen. After the introduction is finished the mixture is heated for 2 hours to 70° C. to 80° C., cooled to room temperature, the solution is then rapidly filtered while conducting nitrogen thereover, and the zinc oxide sludge is washed out with water. In the aqueous solution thus obtained the selenoglycolic acid is contained in the form of its sodium salt.

9. 94 parts of a caustic soda solution of 25 per cent strength are caused to run into 109 parts of an aqueous solution of diseleno diglycolic acid of 26 per cent strength, a solution of 30 parts of crystallized sodium sulfide in 70 parts of water is then added, while introducing nitrogen and the mixture is heated for 1 hour to 70° C. to 80° C. The solution cooled to room temperature contains the sodium salt of the selenoglycolic acid.

When using sodium hydrosulfide or sodium polysulfide instead of sodium sulfide the selenoglycolic acid is likewise obtained in a smooth reaction as sodium salt.

We claim:
1. The compounds of the formula:

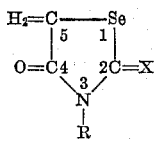

wherein R represents a radical of the group consisting of alkyl, cycloalkyl, aralkyl and aryl, and X stands for a substituent of the group consisting of sulfur and selenium.

2. 3-ethyl-2-thio-1-selenoazolidone-4 of the formula:

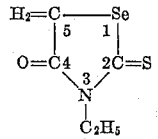

having a melting point of 61° C. to 62° C.

3. 3-allyl-2-thio-1-selenoazolidone-4 of the formula:

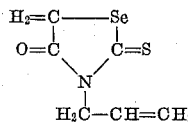

having a melting point of 45° C. to 46° C.

4. 3-phenyl-2-thio-1-selenoazolidone-4 of the formula:

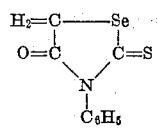

having a melting point of 202° C.

5. The process which comprises causing a compound of the formula:

wherein R represents a radical of the group consisting of alkyl, cycloalkyl, aralkyl and aryl, and X stands for a substituent of the group consisting of sulfur and selenium, to react with selenoglycolic acid in the presence of an aqueous strong acid, while excluding oxygen.

6. The process which comprises heating a compound of the formula:

wherein R represents a radical of the group consisting of alkyl, cycloalkyl, aralkyl and aryl, and X stands for a substituent of the group consisting of sulfur and selenium, with an aqueous solution of selenoglycolic acid in the presence of hydrochloric acid, while excluding oxygen.

7. The process which comprises boiling a mixture of selenoglycolic acid and ethyl mustard oil in an alcoholic aqueous solution containing hydrochloric acid, while excluding oxygen from the reaction mixture by conducting nitrogen through the reaction mixture.

8. The process which comprises boiling a mixture of selenoglycolic acid and allyl mustard oil in an alcoholic aqueous solution containing hydrochloric acid, while excluding oxygen from the reaction mixture by conducting nitrogen through the reaction mixture.

9. The process which comprises boiling a mixture of selenoglycolic acid and phenyl mustard oil in an alcoholic aqueous solution containing hydrochloric acid, while excluding oxygen from the reaction mixture by conducting nitrogen through the reaction mixture.

ADOLF SIEGLITZ.
PAUL HEIMKE.